Sept. 8, 1970  
C. L. BUSHNELL  
3,527,618  
FUEL CELL WITH CARBON DIOXIDE GAS STRIPPER AND  
METHOD OF OPERATION  
Filed May 13, 1968
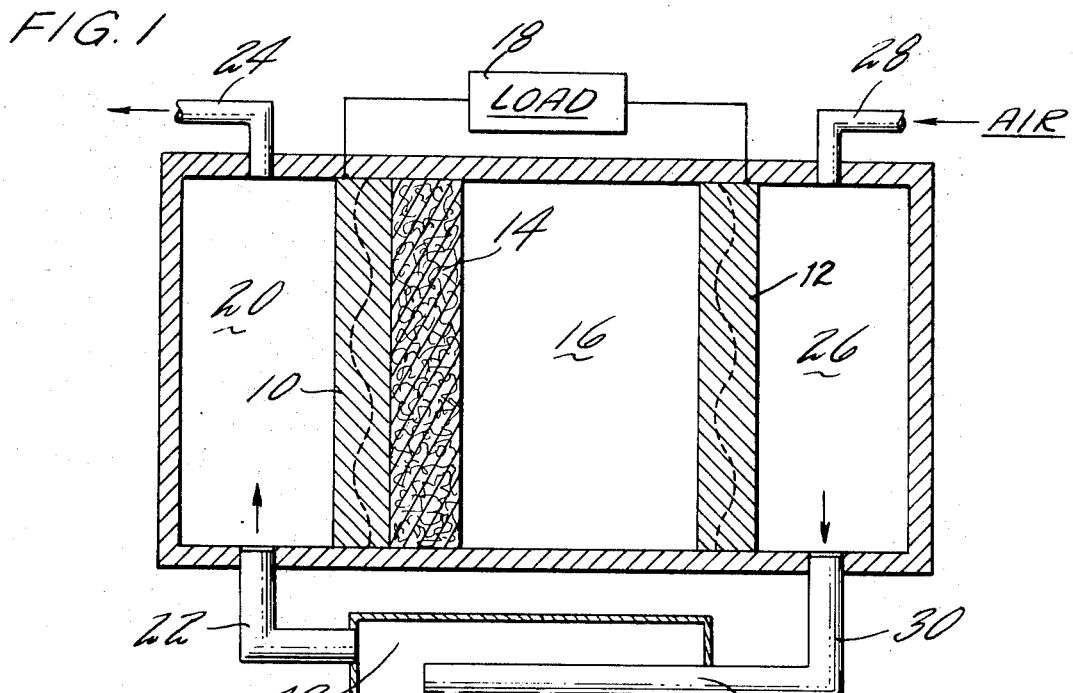
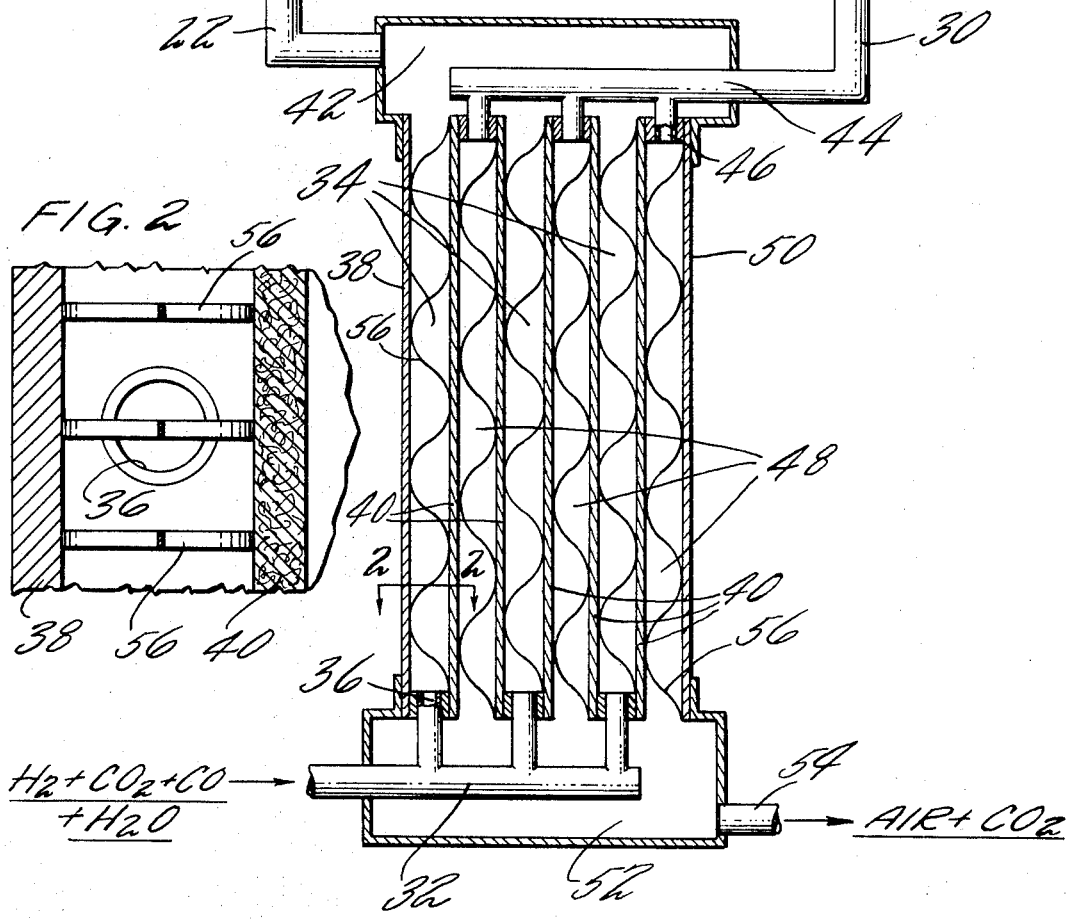
INVENTOR  
CALVIN L. BUSHNELL  
BY Charles A. Warren  
ATTORNEY

United States Patent Office 3,527,618
Patented Sept. 8, 1970

3,527,618
FUEL CELL WITH CARBON DIOXIDE GAS STRIPPER AND METHOD OF OPERATION
Calvin L. Bushnell, South Glastonbury, Conn., assignor to United Aircraft Corporation, East Hartford, Conn., a corporation of Delaware
Filed May 13, 1968, Ser. No. 728,737
Int. Cl. H01m 27/00
U.S. Cl. 136—86                          8 Claims

ABSTRACT OF THE DISCLOSURE

In a fuel cell system, carbon dioxide gas at a high partial pressure in the fuel supply stream is transferred to the process air stream to reduce the carbon dioxide content in the fuel stream. The transfer device consists of a porous separator such as sheet asbestos saturated with an activated potassium carbonate. Passage of a carbon dioxide containing gas alongside the separator permits the carbon dioxide to react with the potassium carbonate to form potassium bicarbonate. The bicarbonate diffuses to the other side of the separator where carbon dioxide and potassium carbonate are formed and carbon dioxide is evolved because of the lower carbon dioxide partial pressure in the air stream.

BACKGROUND OF THE INVENTION

Field of art

This invention relates to fuel cells and in particular relates to a carbon dioxide gas stripper for use in removing carbon dioxide from the fuel gas stream. Specifically, the invention relates to a static carbon dioxide transfer device referred to as a carbon dioxide stripper. In summary, the stripper is used to transfer carbon dioxide from the anode stream to the process air stream.

Description of the prior art

As is well known in the fuel cell art, strong alkalies, such as potassium hydroxide, which are frequently used as electrolytes in a fuel cell, react vigorously with carbon dioxide to form carbonates. These carbonates if allowed to build up and precipitate locally, may cause a severe degradation of performance of the fuel cell.

In order to avoid performance losses as a result of the formation of carbonates, prior fuel cell systems are customarily provided with means for processing the supply of oxidant and the supply of fuel before these enter the fuel cell. For example, it is well known to utilize soda lime scrubbers to remove carbon dioxide from the process air supplied to the cathode. Also, a palladium/silver diffusion membrane is commonly used to remove carbon dioxide from gas generated in a reformer-reactor by allowing the hydrogen to selectively diffuse through the diffusion membrane to be thereafter supplied to the anode of the fuel cell. The use of a palladium/silver separator in a fuel cell system requires a high pressure reformer-reactor since there is a high pressure drop across the diffusion membrane.

In the practical utilization of fuel cells, it is necessary to make the fuel cell as compact and light weight as possible for many applications. It is also necessary to reduce the cost of fuel cell systems so as to widen the advantageous utilization of fuel cells in a maximum number of commercial uses. In the exploratory research on these fuel cells, a fuel cell using an aqueous base electrolyte, which is tolerant of carbon dioxide, has been developed. This carbon dioxide tolerant fuel cell is more completely described in a copending application having U.S. Ser. No. 704,865 of Calvin L. Bushnell et al., having a filing date of Feb. 12, 1968 and assigned to the assignee of the present invention. It has been found from work on the carbon dioxide tolerant base electrolyte cell, that lower carbon dioxide content in the anode stream being fed to the fuel cell results in improved fuel cell performance. Thus, it appears desirable to reduce the quantity of carbon dioxide in the hydrogen feed stream even though the fuel cell is tolerant to carbon dioxide.

SUMMARY OF THE INVENTION

The object of the present invention is to provide a device which transfers carbon dioxide gas at a high partial pressure from one gas stream to a second gas stream.

Another object of the invention is the removal of most of the carbon dioxide from the fuel cell reformer-reactor effluent thereby permitting the use of a low pressure reformer with carbon dioxide tolerant base cells.

A further object of this invention is the provision of a carbon dioxide stripper which can be used in molten carbonate fuel cell powerplants, where the stripper transfers carbon dioxide from the anode exhaust stream to the process air inlet stream since carbon dioxide is required at the cathode in this type of cell.

A still further object of this invention is the use of the stripper to remove substantial amounts of carbon dioxide from the reformer-reactor stream and coupling the stripper with a methanator to provide the final removal of the remaining carbon dioxide and the carbon monoxide from the hydrogen stream for conventional base fuel cells.

Other objects, features and advantages of the present invention will become more apparent from the following detailed description of a preferred embodiment thereof and from the accompanying drawings.

BRIEF DESCRIPTION OF THE DRAWINGS

FIG. 1 is a schematic diagram of a carbon dioxide gas stripper in combination with a carbon dioxide tolerant base electrolyte fuel cell;

FIG. 2 is a fragmentary sectional view taken along the lines indicated at 2—2 in FIG. 1.

DESCRIPTION OF THE PREFERRED EMBODIMENT

Referring briefly to FIG. 1, a carbon dioxide tolerant fuel cell illustrating an application for the present invention is shown. The fuel cell comprises an anode 10 and a cathode 12. A diffusion barrier 14 is disposed adjacent to the anode. The barrier may comprise commercially available asbestos sheeting of suitable thickness. The anode and the cathode are disposed in fluid communication by an electrolyte 16 which is typically potassium hydroxide (KOH). The fuel supply is contained within an anode compartment 20 which has an inlet conduit 22 and outlet conduit 24. The process air supply is contained within the cathode compartment 26 which has an inlet conduit 28 and outlet 30. Electrons liberated at the anode flow through the external load 18 to the cathode. The operation of this carbon dioxide tolerant fuel cell is adequately described in the above mentioned application of Calvin L. Bushnell et al. having a U.S. Ser. No. 704,865.

It has been found from work on the carbon dioxide tolerant base cell that reduced carbon dioxide content in the anode stream results in improved fuel cell performance. Thus it appears desirable to reduce the quantity of carbon dioxide contained in the hydrogen fuel stream.

The present invention significantly reduces the carbon dioxide content in the hydrogen feed stream. The stripper is a static carbon dioxide transfer device which can be used to remove most of the carbon dioxide from the reformer effluent thereby permitting the use of a low pressure reformer with base fuel cells. The stripper has a fuel supply header 32 which carries reformed hydrocarbon fuel from the reformer. The fuel is composed mainly of hydrogen, carbon dioxide and carbon monoxide. Fuel is supplied from the header 32 to the fuel chambers 34 through ports 36. The outer fuel chamber 34 is defined essentially by the wall 38 and separator 40. It is apparent that the internal fuel chambers are defined by the separators 40 themselves. As fuel passes through the fuel chambers, carbon dioxide is absorbed by the separators 40. Thereafter, the fuel accumulates in the fuel outlet collector 42 and is ducted through conduit 22 to the anode compartment.

In similar fashion, air is ducted from the cathode compartment 26 to the air supply header 44 then through ports 46 to air chambers 48. The outer air chamber is formed by the wall 50 and a separator 40. The inner air chambers are formed by the separators 40 themselves. As air passes through the air chambers carbon dioxide is evolved to the air due to the low partial pressure in the air stream. Air accumulates in the air outlet collector 52 and is exhausted through conduit 54.

The separators 40 are shown as relatively thin plates and may be supported by spacers 56 to provide additional resistance to external shock. The air and fuel chambers generally have a thickness from 30 to 100 thousandths (.030 to .100) of an inch to provide compactness. The spacers 56 may be porous plates, plastic screen, phenolic screen and the like. As shown in FIG. 2, the spacers are a series of wiggle strips.

The separators 40 may be a porous matrix such as asbestos, porous nickel or porous plastics. The thickness of these separators is in the order of ten thousandths (.010) of an inch to minimize the diffusional resistance across the separator. The preferred separator is a commercially available porous sheet asbestos. The separator is saturated with an activated aqueous solution of potassium carbonate and bicarbonate. The carbon dioxide containing gas flows over one side of the separator and air which is essentially carbon dioxide free, flows over the other side in a counter direction. The basis for the carbon dioxide removal is the equilibrium equation:

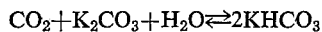

$$CO_2 + K_2CO_3 + H_2O \rightleftharpoons 2KHCO_3$$

The carbon dioxide reacts with carbonate to form bicarbonate and the reaction proceeds to the right. The bicarbonate diffuses through the separator to the opposite surface of the separator where the bicarbonate dissociates to evolve carbon dioxide to the air stream and potassium carbonate because of the lower carbon dioxide partial pressure in the air stream. Next, potassium carbonate diffuses back through the separator to the carbon dioxide source side of the separator to recombine with carbon dioxide.

Carbon dioxide absorption to form bicarbonate is exothermic while the bicarbonate decomposition to form carbon dioxide and carbonate is endothermic. These heat effects are accommodated by conduction across the separator from the carbon dioxide source side to the carbon dioxide removal side. Extremely small temperature differences are required to transfer the required energy and thus the carbon dioxide stripper requires no external power.

The rate of transfer of carbon dioxide can be improved by the addition of an activator such as arsenic trioxide, sodium arsenite, potassium arsenate or selenious acid. Selenious acid is preferred. Test results indicate that a 3–6 fold increase in transfer rate is possible with the use of an additive. Reformed natural gas contains about 20% carbon dioxide and preliminary tests indicate that the stripper has the potential of removing about 90% of the carbon dioxide in the fuel supply stream.

The major advantages of this carbon dioxide stripper stem from the fact that the system is a static carbon dioxide removal device. The stripper is less complicated than the wet process devices generally used in industry. It has been found that there are a wide selection of readily available materials which are compatible with the potassium carbonate and potassium bicarbonate. The stripper is compact and essentially requires no external energy.

Although the stripper is shown in connection with a carbon dioxide tolerant fuel cell where the stripper is designed to remove carbon dioxide from the fuel supply prior to the entry of the fuel into the anode compartment, it is apparent that this scheme has many other applications. For example, in molten carbonate fuel cells, the carbon dioxide stripper could be reversed to transfer carbon dioxide from the anode effluent to the inlet process air entering the cathode. In the molten carbonate fuel cell a high carbon dioxide content is required in the cathode compartment. The carbon dioxide stripper could also be used with the conventional base electrolyte fuel cell power plant. In this application, after leaving the stripper, the fuel is fed to a methanator where the remaining carbon dioxide and carbon monoxide is converted to methane so that hydrogen and methane and steam enter the anode compartment.

Although the invention has been shown and described with respect to a preferred embodiment, it should be understood by those skilled in the art that various changes and omissions in the form and detail may be made therein without departing from the spirit and the scope of the invention which is to be limited and defined only as set forth in the following claims:

I claim:
1. In combination, a fuel cell having spaced anode and cathode electrodes and an electrolyte in the space therebetween, compartments on the sides of the electrodes opposite the electrolyte for fuel and air gas respectively, each compartment having an inlet and an outlet, and a static carbon dioxide stripper comprising:
   means defining a second chamber including means for carrying hydrogen and gaseous impurities thereto and then to the anode compartment inlet;
   means defining a second chamber including means for carrying an air stream in fluid communication with the cathode compartment of the fuel cell the second chamber;
   a porous separator between and in communication with the chambers, the separator being saturated with an aqueous solution of an activated potassium carbonate and bicarbonate wherein the carbon dioxide from the impurities in said hydrogen stream reacts with carbonate in the separator to form bicarbonate which diffuses to the opposite side of the separator where the bicarbonate disassociates to evolve carbon dioxide to said air stream.

2. The combination of claim 1, wherein the porous separator is sheet asbestos saturated with an aqueous solution of potassium carbonate and bicarbonate and activated by selenious acid.

3. In combination, a fuel cell having spaced anode and cathode electrodes and an electrolyte in the space therebetween, compartments on the sides of the electrodes opposite the electrolyte for fuel and air gas respectively, each compartment having an inlet and an outlet, and a static carbon dioxide stripper comprising:
   means defining a plurality of first chambers carrying fuel supply stream containing carbon dioxide thereto and then to the anode compartment inlet;
   means defining a plurality of second chambers including means for carrying an air stream adjacent to the first chambers and in fluid communication with the cathode compartment of the fuel cell, said chambers adapted to receive carbon dioxide from the fuel supply stream; and
   a plurality of porous separators interspaced between and in communication with the first and second chambers, the porous separators being saturated with an activated alkali carbonate and bicarbonate so that carbon dioxide from said cell is absorbed from the fuel supply stream and evolved to said air stream.

4. The combination of claim 3, wherein the porous separators are sheet asbestos and the activator is selenious acid.

5. The combination as in claim 3, wherein the porous separators are sheet asbestos saturated with a selenious acid activated aqueous solution of potassium carbonate and bicarbonate and the separators are supported by spacers to improve resistance to shock.

6. In combination, a carbon dioxide tolerant fuel cell having spaced anode and cathode electrodes, a diffusion barrier disposed against the anode and an electrolyte in the space therebetween, compartments on the side of the electrodes opposite the electrolyte for fuel and air gas respectively, each compartment having an inlet and an outlet, and a static carbon dioxide stripper comprising:
  means defining a first chamber including means for carrying hydrogen and gaseous impurities from said chamber to the anode compartment inlet;
  means defining a second chamber carrying air from the cathode compartment of the fuel cell to said second chamber;
  a porous separator between and in communication with the chambers, the separator being saturated with aqueous solution of an activated potassium carbonate and bicarbonate wherein the carbon dioxide from the impurities in the hydrogen stream reacts with carbonate in the separator to form bicarbonate which diffuses to the opposite side of the separator where the bicarbonate dissociates to evolve carbon dioxide to the air stream.

7. In a system having a fuel cell with spaced anode and cathode electrodes and an electrolyte in the space therebetween, compartments in the sides of the electrodes opposite the electrolyte for fuel and air respectively, each compartment having an inlet and an outlet for a fuel stream and an air stream, the method of transferring carbon dioxide gas from the fuel stream to the air stream comprising:
  flowing the fuel supply stream containing carbon dioxide on one side of a porous separator prior to flowing said stream into anode compartment;
  feeding the air stream to the opposite side of the porous separator;
  separating the two streams in a static separator including a porous separator saturated with an aqueous solution of an activated potassium carbonate and bicarbonate wherein the carbon dioxide in the fuel supply stream reacts with the carbonate in the separator to form bicarbonates which diffuse to the opposite side of the separator where the bicarbonate disassociates evolving carbon dioxide to the air stream.

8. The method of claim 7, including:
  activating the porous saturator with a selenious acid.

References Cited
UNITED STATES PATENTS

| | | | |
|---|---|---|---|
| 3,297,483 | 1/1967 | McEvoy | 136—86 |
| 3,337,368 | 8/1967 | Oswin | 136—86 |
| 3,338,747 | 8/1967 | Plust et al. | 136—86 |
| 2,901,524 | 8/1959 | Gorin et al. | 136—86 |
| 3,331,703 | 7/1967 | Young | 136—86 |

ALLEN B. CURTIS, Primary Examiner

U.S. Cl. X.R.

23—1

PO-1050
(5/69)

UNITED STATES PATENT OFFICE
CERTIFICATE OF CORRECTION

Patent No. 3,527,618          Dated September 8, 1970

Inventor(s)  CALVIN L. BUSHNELL

It is certified that error appears in the above-identified patent and that said Letters Patent are hereby corrected as shown below:

| | |
|---|---|
| Claim 1, column 4, line 36 | delete "second" and insert --first-- |
| Claim 1, column 4, line 41 | after "cell" insert --and-- |
| Claim 3, column 4, line 63 | after "chambers" insert --including means for-- |
| Claim 6, column 5, line 21 | after "chamber" insert --including means for-- |

SIGNED AND
SEALED
JAN 12 1971

(SEAL)
Attest:

Edward M. Fletcher, Jr.
Attesting Officer

WILLIAM E. SCHUYLER, JR.
Commissioner of Patents